April 29, 1930.                 J. M. ODEN                    1,756,698
                          SAFETY GASOLINE HOSE
                          Filed Jan. 11, 1927
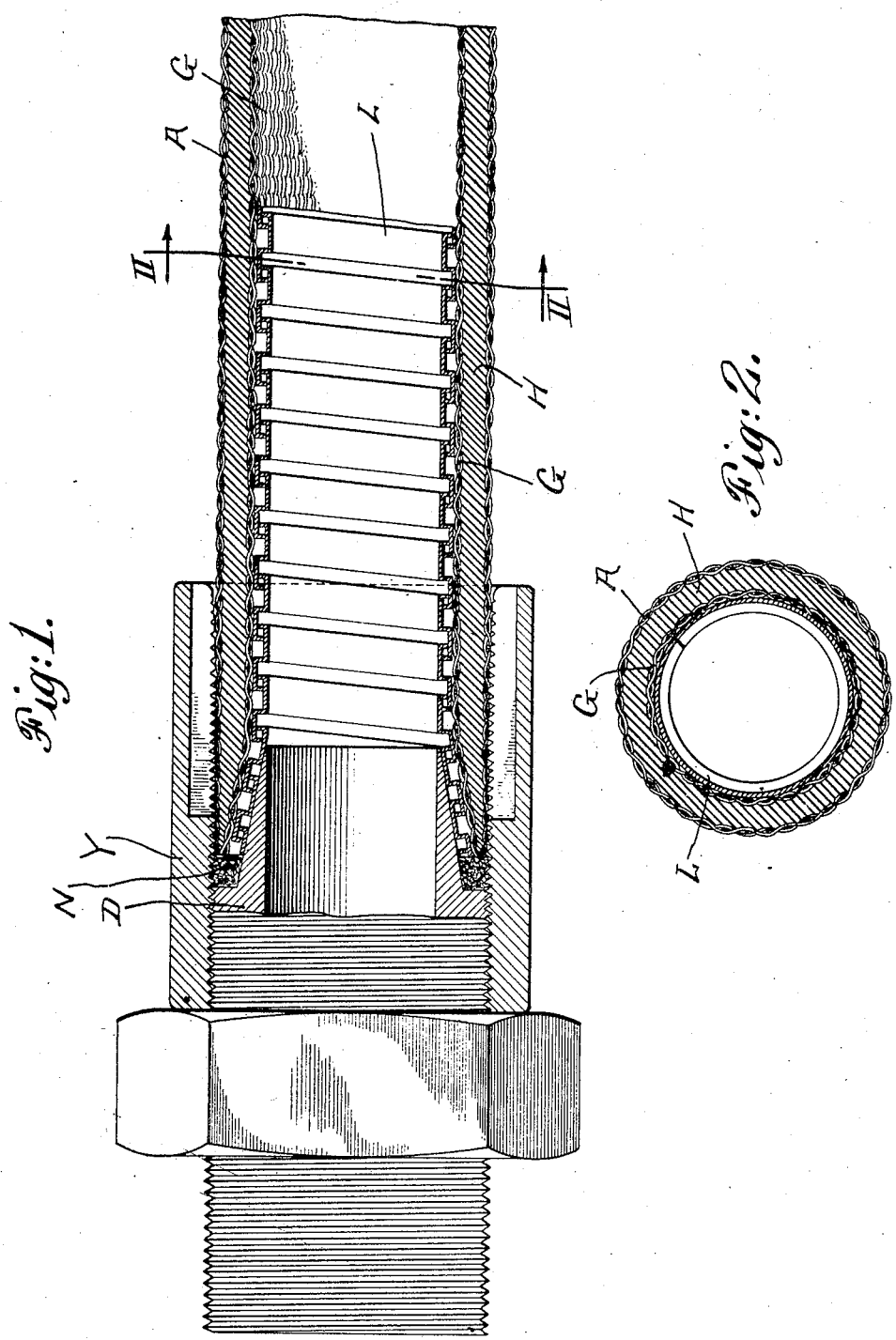

Patented Apr. 29, 1930

1,756,698

UNITED STATES PATENT OFFICE

JOHN M. ODEN, OF BROOKLYN, NEW YORK

SAFETY GASOLINE HOSE

Application filed January 11, 1927. Serial No. 160,362.

This invention relates to a safety gasoline hose, and an object is to provide a hose which although formed largely of rubber, or rubber composition, said rubber is so protected as to be not liable to injury in the presence of gasoline or other solvent hydro-carbon fluid flowing through or applied to the hose.

A more specific object is to provide a rubber hose having a sheath which is impervious to the solvent action of the hydro-carbon liquid fuel, and which is arranged in position for preventing access of the hydro-carbon liquid to the rubber.

A further object is to so construct and arrange the sheath that it will assist in the easy flexing of the hose.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a longitudinal sectional view through a hose constructed in accordance with this invention, showing the same connected with a coupling device, and Fig. 2 is a transverse sectional view taken upon the plane of line II—II of Fig. 1.

Referring to the drawing for a more detailed description of the structure illustrated therein, the reference character L indicates the inner metallic liner. The reference character G indicates the guard means or sheath which covers this liner. The reference character H indicates the rubber covering applied over the sheath G. And the reference character A indicates an outer woven fabric sheath or covering which is applied over the rubber H.

The liner L may be of any approved construction. That illustrated however is of a well-known standard form and is made of a single strip of thin sheet metal bent into S cross-section and spiral form and having its convolutions over-lapping and interlocked in such manner that the exterior of the liner presents a transversely spirally corrugated surface the ridges of which move freely toward and away from each other whenever the liner is flexed, as will be readily understood by any one familiar with flexible tubes of this character.

The sheath G is illustrated as made up as a coarse woven fabric, being preferably woven directly about the liner and being of a sufficiently tight texture so that no appreciable amount of the rubber covering H can squeeze through it into contact with the liner. While it is amply flexible and elastic to readily accommodate the bending or flexing movements of the hose it is yet sufficiently stiff to prevent any appreciable sinking or sagging of its component parts into the grooves of the liner. It merely bridges from ridge to ridge along the liner and acts as a shield for said grooves and a support for the rubber cover.

The rubber covering H may be made of any desired consistency and thickness.

The outer cover or sheath L may be of any preferred type but preferably consists of woven fabric or canvas fabric similar to that comprising the inner sheath. This outer sheath is preferably woven directly about the rubber cover H, and in the operation of applying it a sufficient tension is given to its component strands so that it operates to compress the rubber against the outer surface of the sheath G. By making the outer sheath of woven fabric the same provides a suitable strong and tough protecting armour for the hose and yet one which is suitably elastic and flexible to accommodate the flexing movement of the hose.

In my Patent No. 1,607,909, issued November 23rd, 1926, there is shown a hose having the characteristics as above referred to but in which the safety of the rubber covering material L against the attacks of the gasoline or other hydro-carbon fluid passing through the hose is sought to be obtained by simply improving the consistency, quality and general condition of the rubber covering in the finished hose, no effort having been made to positively prevent the gasoline, etc., from reaching the rubber. By the present invention the same mechanical construction may be utilized as described in said patent, that is the sheath G may be utilized to prevent entrance of any part of the rubber into the spaces between the external ridges of the metallic liner, it may provide a soft, tough, fibrous and non-adhesive surface to wear against the outer surface of the ridges of the liner for accommodating the rubbing movements of said ridges incident to the incessant bending of the hose in use, and it may be of strong, resilient, flexible and elastic woven fabric or other material as referred to in said patent.

In addition to this however the present invention proposes the use of a gasoline proof shield interiorally of the rubber covering, and preferably between the metallic liner and said rubber covering, to positively prevent access of the gasoline to the rubber. To this end it is proposed that the shield or sheath G may not only have the characteristics as above referred to but shall be proof against passage of gasoline or other solvent hydrocarbon fluid outwardly therethrough from within the hose to the rubber. It may consist of woven fabric or canvas as described in said patent and it may be impregnated with suitable proofing compound either before or after its application onto the metallic liner, or its component strands may be suitably coated and impregnated with the proofing compound before or while being woven into sheath form upon the metallic liner. For this purpose any suitable impregnating or coating material or compound may be employed which will be impervious to the solvent action of a hydro-carbon liquid fuel, among which glycerine, shellac, various glues, various gums, molasses, various oils, for instance castor oil, various waxes, for instance beeswax, and various lacquers, are suggested, any of which when properly applied to the material constituting the sheath G will render said sheath proof against passage of gasoline or other hydro-carbon fluid therethrough.

And here it may be mentioned that the proofing material used may actually constitute a lubricant upon the inner surface of the sheath for rubbing against the outer surface of the ridges of the metallic liner, and thus reduce friction and provide for more easy flexing of the hose.

It is also a feature of this invention to provide, in combination with the gasoline proof sheath G, a gasoline proof end shield N arranged as a gasket at the end of the hose and in position to be engaged by and co-operate with the end portion of the sheath G to prevent possible access of gasoline to the end portion of the rubber covering H from within the interior of the hose.

The shield or gasket N is particularly serviceable when the end portion of the hose is connected with a coupling device. As illustrated in the drawing a coupling device is shown consisting of a body member D having a part extending into the end of the hose and having a sleeve Y threaded over the body and over the end portion of the hose to hold the hose connected with the body. The shield or gasket N occupies a position intermediate the body and sleeve and is thus held in firm sealing engagement against the end of the hose so that no gasoline can reach the end of the rubber covering H. By its position it also serves the added purpose of preventing any leakage of the contents of the hose through the joint between these parts.

The end shield N may be connected with the hose as a part thereof prior to connection of the hose with the coupling or it may be merely contained within the coupling in position to receive the end of the hose in co-operative assembly therewith when the coupling is attached onto the hose.

It may be formed of any appropriate material, such as twisted cotton fibre or otherwise suitably treated by a gasoline proofing compound the same as already referred to with regard to the sheath G.

Hose of this type, when connected with a coupling and in use receives its most severe strains in the region immediately adjacent the coupling and it is therefore important to prevent as far as possible any deterioration of the rubber covering H in this region. It will be apparent that by means of this invention the presence of the gasoline proof sheath G within the hose and the presence of the gasoline proof shield at the end of the hose will effectually guard the mentioned region of the hose against the deteriorating effects of gasoline which might otherwise penetrate through the metallic liner to the rubber or around the end of the hose to the rubber.

In addition to this the outer woven fabric sheath or covering A may if desired be impregnated or otherwise treated or formed as suggested for the sheath G to constitute a gasoline proof covering or sheath for the outer surface of the rubber H.

The metallic liner at all times serves to reinforce the hose against collapse from external pressure and against acute flexing, and thus guards the gasoline proof sheaths against damaging strains. It is itself to some extent proof against passage of gasoline outwardly to the rubber tube H which surrounds it but practice has shown that it is pervious and therefore can not be fully relied upon in this connection, and hence the necessity for providing the gasoline proof sheath intermediate its outer surface and the inner surface of the rubber tube.

Here it may be mentioned that the manner of constructing the sheaths A and G may take any desired form, either a woven fabric, wrapped or braided strands, either of cotton or other fibre, either coarse or fine, or it may be of a paper or other composition, or otherwise as may be found best suited to the purpose.

Further it is noted that although a desirable object of the present invention is to make the inner sheath of such a construction as to bridge the ridges of the metallic liner for accomplishing the various purposes above referred to, it is not desired that the invention be understood as limited in this regard as in some cases it may be found preferable to make the inner sheath to sink into the space between the ridges of the metallic liner.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. A gasoline hose comprising a flexible pervious metallic liner, a rubber cover therefor, a flexible sheath interposed between the liner and the cover, an end shield at the end of the hose overlying the end edges of said sheath and cover, means rendering both said sheath and said shield impervious to passage of liquid hydro-carbon fuel therethrough to the cover, and said sheath and shield being in engagement with each other to provide a joint impervious to the passage of liquid hydro-carbon fuel therethrough to said cover.

2. A gasoline hose comprising a flexible pervious metallic liner, a rubber cover therefor, a flexible sheath interposed between the liner and the cover, a second flexible sheath exteriorally of the mentioned cover, an end shield at the end of the hose overlying the end edges of said cover and sheaths, means rendering both of said sheaths and said shield impervious to passage of liquid hydro-carbon fuel therethrough to the rubber cover, and said shield being in engagement with the end edges of said sheaths to provide joints impervious to the passage of liquid hydro-carbon fuel therethrough to said rubber cover.

3. A gasoline hose comprising a flexible pervious metallic liner, a rubber cover therefor, and protecting means for said rubber cover at both the interior and exterior surface of said cover and at the end edge of the cover, said protecting means being of a character impervious to the passage of liquid hydro-carbon fuel therethrough, to either the interior surface or exterior surface or the end surface of the rubber cover.

In testimony whereof I affix my signature.

JOHN M. ODEN.